July 7, 1959   J. J. DUZICH   2,893,561
MAGNETIC FILTER ELEMENTS
Filed March 7, 1958

INVENTOR.
JOHN J. DUZICH
BY
Charles E. Willson
ATTORNEY

United States Patent Office 2,893,561
Patented July 7, 1959

2,893,561

MAGNETIC FILTER ELEMENTS

John J. Duzich, Pawtucket, R.I., assignor to Fram Corporation, Providence, R.I., a corporation of Rhode Island Application March 7, 1958, Serial No. 719,860

8 Claims. (Cl. 210—223)

This invention relates to filter elements, and more particularly to magnetic filter elements capable of removing minute particles of ferrous metal from a stream of oil or other liquid.

In some fields in which such liquids may be used, as, for example, in the fields of lubrication and hydraulic liquids, the presence of fine ferrous particles in the liquid stream may be highly objectionable because they tend to collect at critical points in the flow system and interfere with the operation of the valves and other mechanism contacted by such liquid.

In most commercial fields of use, such as aviation, automotive and machine shops, it is not practical to use filters fine enough to remove particles down to a few microns in size, because such filters allow the liquid to pass only slow therethrough and plug quickly. If, however, means are provided for removing from a liquid stream all ferrous metal particles, such as iron or steel, down to a few microns in size, a highly desirable result may be obtained.

The present invention can be given various embodiments and resides primarily in a sheet, batt or mass of fibrous filter material having lodged therein or attached to a face thereof small particles of magnetic material. These magnetized particles are preferably disposed close together within the filter sheet or mass or over the surface thereof, so that any ferrous particles in the liquid stream passing through such filter will flow close to one of these magnets to be attracted and held thereby. These small magnets may be in the form of metal particles or metal fibers which are capable of retaining their magnetic properties for a long period of time. Such metal particles or fibers are preferably larger in size than the pores of the filter sheet so that they will not escape through such pores if they work loose from the filter medium.

By employing the construction of the present invention it is possible to provide a filter that will not clog quickly and which will remove from the liquid stream all ferrous metal particles larger than a few microns in size. By so removing very small metal particles, they are prevented from building up at critical points in the passages through which the liquid flows.

The above and other features of the present invention will be further understood from the following description when read in connection with the accompanying drawing, wherein.

Figure 1:
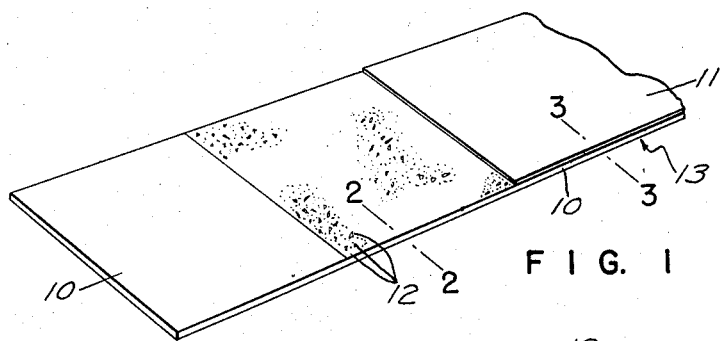
Fig. 1 is a perspective view of a sandwich construction comprising two sheets of porous fibrous material having minute magnetic particles disposed between the sheet.

Referring to Fig. 1 of the drawing, the numeral 10 is used to designate one sheet of porous fibrous material, and the numeral 11 is used to designate a second sheet of such material. Between these two sheets are disposed in close relation to each other many small particles 12 of magnetic material. The two sheets are secured together with the metal particles therebetween by means to be described so as to form a sandwich construction.

The porous fiber sheets 10 and 11 may be formed of various fibers such as wood fibers, cotton linters, cut synthetic fibers, or other organic fibers having good dirt retaining properties, and these fibers may be water-laid or air-laid to form a sheet or batt. The magnetic particles 12 in the form of powder or fibers may be formed of any magnetic material or alloy that is capable of forming permanent magnets that will maintain their magnetic properties over a long period of time.

Figure 2:
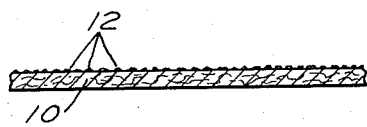
Fig. 2 is a sectional view taken on the line 2—2 of Fig. 1.

The magnetic filter elements contemplated by the present invention may have the construction shown in Fig. 2 and comprise a porous fibrous sheet 10 having the small particles of magnetic material 12 bonded to one face thereof as shown. These particles should be bonded to the upstream face of the filter element so that such magnetic particles will not pass through the filter sheet 10 should they become dislodged from the surface of the fiber sheet; also, these particles should be larger in diameter than the pores of this sheet so that they will not migrate through this downstream sheet. However, such particles may be so small that their major diameter does not exceed one hundredth of an inch.

Figure 3:
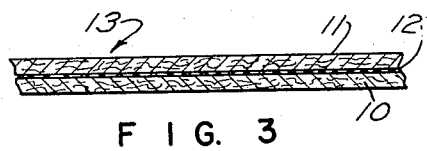
Fig. 3 is a sectional view taken on the line 3—3 of Fig. 1.

The magnetic filter element contemplated by the present invention may also take the sandwich construction best shown in Fig. 3 and indicated by the numeral 13, and wherein the particles of magnetic material 12 are disposed between the sheets 10 and 11 as shown.

Figure 4:
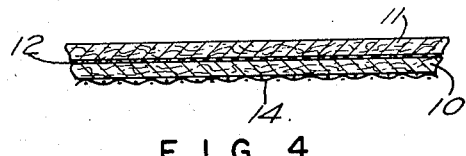
Fig. 4 is a view similar to Fig. 3 except that a woven screen is provided at one face of the construction of Fig. 3.

Since fibrous filter sheets such as indicated by 10 and 11 may permit some migration of their fibers that become loose, it may be desirable in certain cases to provide the sandwich construction of Fig. 3 with a finely constructed screen 14 disposed at the downstream side of such sandwich as shown in Fig. 4. The purpose of such screen is to hold back any fibers of the filter sheets that may come loose and enter the stream of the liquid being filtered. The screen 14 is preferably formed of non-ferrous metal, such as copper or brass, so as not to interfere with the desired operation of the magnetic particles 12.

Figure 5:
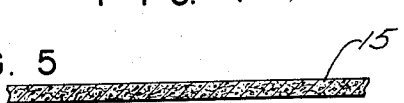
Fig. 5 is a modification showing a porous filter sheet having the small magnetic particles disposed throughout the interior of the sheet.

Fig. 5 shows a modification and comprises a porous fibrous filter sheet 15 having disposed within the interior of such sheet the particles 16 of magnetic material. These magnetic particles are preferably mixed with the fibrous stock at the time the sheet 15 is being formed.

In each of the constructions so far described, it is deemed desirable to secure the small particles of magnetic material, in the position in which they are shown, before such particles are magnetized. After these particles are anchored in place they are subjected to the desired magnetizing forces. This procedure is desirable because if the metal particles are magnetized before they are anchored in place, they would be attracted towards each other to form undesirable clusters or bunches.

When porous fibrous sheet material such as indicated by 10, 11 and 15 is to be used to filter oil or other liquids containing moisture, it is usually desirable to treat the fibrous sheet with a resinous material such, for example, as phenol formaldehyde to hold the fibers in place and to impart added stiffness to the filter sheet to prevent it from becoming limp in the presence of moisture. The filter sheets here shown are preferably so treated and if the phenol resin used to impregnate the sheet has an added bonding agent such as polyvinyl acetate mixed therewith, a tenacious resinous bonding agent will be produced capable of firmly anchoring the magnetic particles 12 in place and of holding the sheets 10 and 11 together to form the sandwich best shown in Fig. 3.

Figure 6:
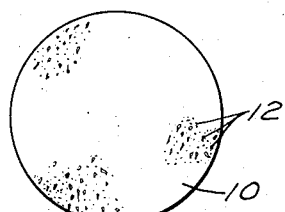
Fig. 6 is a plan view of a filter disc cut from the material shown in Fig. 2.

The magnetic filter sheets shown in Figs. 1 to 5 inclusive may be employed in various types of filters. One such filter is shown in Fig. 6 in which the filter element of Fig. 2 is cut to form the disc shown, which may be secured in the desired filtering position to act as a surface type filter.

Figure 7:
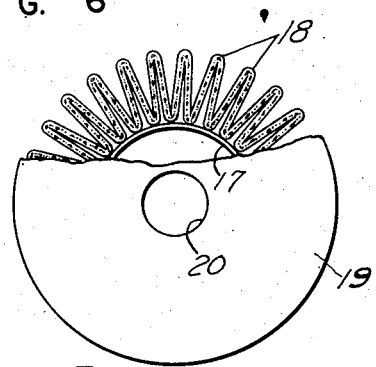
Fig. 7 is a top plan view with part broken away of a pleated liquid filter.

The filtering material shown in Figs. 2 to 5 inclusive may also be employed to form the pleated filter element of Fig. 7, wherein the magnetic filter sheet is pleated as indicated at 18, and these pleats are arranged in the form of an annulus about a perforated center tube 17. The filter element thus formed is preferably provided with the end caps 19 which are bonded to the opposite ends of the pleated filter element 18, and such end caps 19 have the center hole 20 to receive the usual filter center bolt.

Figure 8:
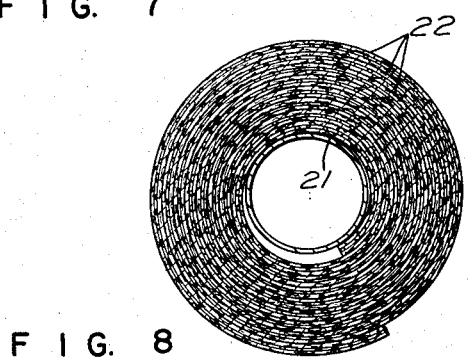
Fig. 8 is a horizontal sectional view through a cylindrical filter formed by wrapping a sheet of filter material spirally about a central core.

The filter material shown in Figs. 2 to 5 inclusive may also be employed as a depth type of filter element, such as shown in Fig. 8, wherein the magnetic filter sheet is wound spirally upon itself about a perforated center tube 21 to form the spiral package 22 through which the liquid to be filtered may pass in an outside-in direction or an inside-out direction, as desired.

Figure 9:
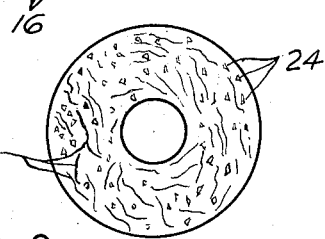
Fig. 9 is a top plan view of a molded filter formed of fine fibers.

The magnetic filter element contemplated by the present invention, in addition to having the sheet formation above described, may take the form of a molded mass of fibers, such, for example, as the molded cylindrical mass of textile fibers 23 shown in Fig. 9. These fibers are held in the desired molded shape by a bonding agent such as above described, and throughout this molded mass are distributed and bonded in place the magnetic particles 24. In such a filter mass the magnets 24 will tend to collect and hold the fine ferrous particles in the stream being filtered.

In each of the constructions shown the magnetic particles 12, 16 and 24 are preferably disposed close to each other throughout the filter element so that all the liquid passing through this filter element will pass close to one or more magnetic particles.

Having thus described my invention, what I claim and desire to protect by Letters Patent is:

1. A filter for filtering liquids containing fine particles of ferrous metal, comprising a porous sheet formed of organic fibers and having disposed in close relation to each other over one face thereof small particles of magnetic material that are secured to the sheet, said small particles being magnetized to form minute magnets distributed over the sheet at the upstream side thereof, so that ferrous particles in the liquid being filtered will be trapped and held by these minute magnets.

2. A filter for filtering liquids containing fine particles of ferrous metal, comprising two porous sheets formed of organic fibers and having disposed therebetween in close relation to each other small particles of magnetic material, means for securing the two sheets together and said small particles in place therebetween in the form of a sandwich, said small particles being magnetized to form minute magnets disposed between the sheets, so that ferrous particles in the stream being filtered will be trapped and held by these minute magnets.

3. A filter as defined in claim 2, wherein a closely fabricated metal screen is disposed at the downstream side of the sandwich construction.

4. A filter for filtering liquids containing fine particles of ferrous metal, comprising two sheets of porous non-metallic organic material secured together and having disposed therebetween in close relation to each other small particles of magnetic material, said small particles being magnetized to form minute magnets, so that ferrous particles in the liquid being filtered will be trapped and held by these minute magnets.

5. A filter as defined in claim 4, wherein most of the magnetized particles have a length of less than one-hundredth of an inch.

6. A pleated filter element for filtering a liquid containing minute particles of ferrous metal, comprising two porous sheets formed of organic fibers and having disposed between them in close relation to each other small particles of magnetic material, means for securing the sheets together and the particles in place therebetween, said small particles being magnetized to form minute magnets disposed between the sheets, the two sheets with the particles therebetween being pleated and operable so that ferrous particles in the liquid being filtered therethrough will be trapped and held by the minute magnets.

7. A filter for filtering liquids containing fine particles of ferrous metal, comprising a porous filter element formed of organic fibers and provided with small particles of magnetic material attached to the fibers of said element in close relation to each other over a large portion of such element, said small particles being magnetized to form minute magnets so that ferrous particles in the liquid being filtered will be trapped and held by these minute magnets.

8. A filter for filtering liquids containing fine particles of ferrous metal, comprising a porous filter element formed of organic fibers and having disposed within the element in close relation to each other small particles of magnetic material, said small particles being magnetized to form minute magnets within the element so that ferrous particles in the liquid being filtered will be trapped and held by these minute magnets.

References Cited in the file of this patent
UNITED STATES PATENTS

| | | |
|---|---|---|
| 1,980,119 | Wait | Nov. 6, 1934 |
| 2,349,469 | Sloan | May 23, 1944 |
| 2,661,387 | Ackermann | Dec. 1, 1953 |
| 2,782,933 | Monsarrat | Feb. 26, 1957 |
| 2,797,163 | Smith et al. | June 25, 1957 |